May 20, 1941.  A. S. RAMAGE  2,243,053
PROCESS FOR MANUFACTURING OXYGEN COMPOUNDS OF TERPENE HYDROCARBONS
Filed Oct. 10, 1939
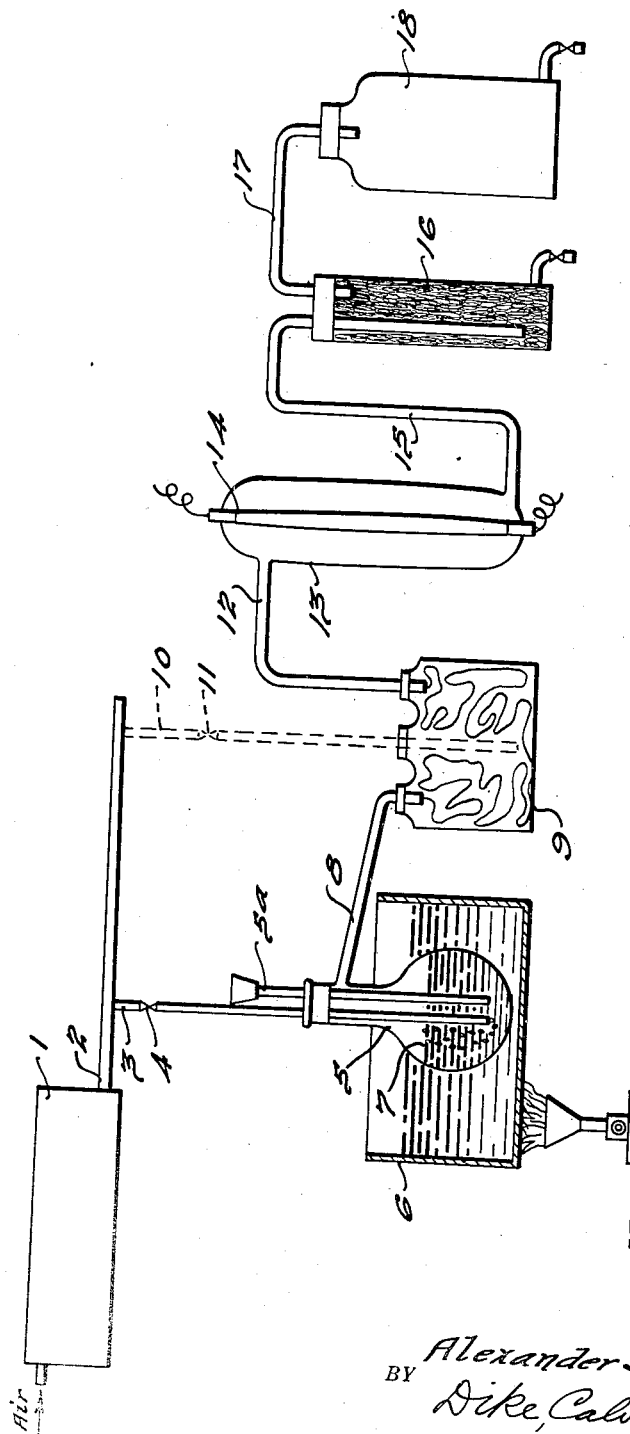
INVENTOR
Alexander S. Ramage.
BY Dike, Calver & Gray
ATTORNEYS Patented May 20, 1941

2,243,053

UNITED STATES PATENT OFFICE 2,243,053

PROCESS FOR MANUFACTURING OXYGEN COMPOUNDS OF TERPENE HYDROCARBONS

Alexander S. Ramage, Detroit, Mich.

Application October 10, 1939, Serial No. 298,861
In Great Britain August 30, 1931

7 Claims. (Cl. 260—339)

The present invention relates to a process for manufacturing oxygen compounds of terpene hydrocarbons and to the novel products resulting therefrom.

It is an object of the present invention to provide a process for the efficient manufacture of oxygen containing compounds of terpene hydrocarbons, such for example as oil of eucalyptus or cineol, whereby an increased volume of active or nascent oxygen is liberated from a given amount of the compound within a given time.

Another object of the invention is to provide a process for the manufacture of oxygen compounds of terpene hydrocarbons in which an increased volume of oxygen is so coupled with the terpene base as to be speedily liberated and readily available when desired, the oxygen when liberated being substantially in its active or nascent state and thus to provide a therapeutic product which has germicidal, antiseptic and healing properties of greater activity than similar types of therapeutic products previously known.

Other objects and advantages of this invention will appear in the following description and appended claims.

In my prior United States Patent No. 710,893 I have described and claimed a new chemical compound which is there designated as terpene peroxide and to which I have fixed an approximate formula of $C_{10}H_{18}O_2$. This product is insoluble in water but decomposes in its presence to form terpene and hydrogen peroxide. As described in this patent, this compound was prepared by bubbling ozone or ozonized air through a body of a terpene hydrocarbon such as oil of eucalyptus, cineol, or any hydrocarbon oil containing cineol as an ingredient, at superatmospheric temperatures, preferably about 60° C. The white fumes of the peroxide were evolved and condensed in a separate vessel by cooling to about 0° C. The condensed liquid product was the chemical product above mentioned. This process by which the product was manufactured is disclosed and claimed in my prior United States Patent No. 1,098,356 of May 26, 1914.

In my United States Patent No. 1,097,939 I have disclosed a process utilizing a catalytic agent such as platinized asbestos for the purpose of effecting a more rapid and complete conversion of the terpene to the oxygen compound thereof by vaporizing the hydrocarbon and bringing such vapors into contact with ozone in the presence of such catalytic agent.

According to my United States Patent No. 1,097,940 cineol was subjected at atmospheric temperatures and in the presence of platinized asbestos to the continued action of ozone for several hours until it was converted into a viscous non-volatile syrupy liquid which was found to evolve active or nascent oxygen in sufficient quantities to function as a germicide and which decomposed explosively when subjected to heat.

In my United States Patent No. 1,585,602 I have disclosed a process for making an oxygen compound of a terpene hydrocarbon and the product resulting therefrom in which the continued action of ozone upon the vapors of the unstable oxygen compounds of the terpene, containing not more than two atoms of oxygen to the molecule, were further oxidized to yield a novel compound of much higher oxygen content than had been formed according to the processes of my prior patents. The compound which is disclosed in this patent was assigned the approximate formula of $C_{10}H_{18}O_4$. Under normal atmospheric temperatures this product in one hour decomposed at such a rate as to liberate approximately 3 cc. of active or nascent oxygen per gram.

The present method and product resulting therefrom subjects a terpene hydrocarbon, such for example as oil of eucalyptus or cineol, to contact with ozone or ozonized air to form a preliminary or intermediate oxygen compound of the terpene, which is substantially the same as the product of my prior United States Patent No. 1,585,602. This compound while in its vapor phase is then subjected to a further treatment to produce the completed product. The further treatment consisting of irradiating the vapors of the oxygen-terpene compound with energy rays chiefly of the ultra violet spectrum is for the purpose of modifying the final product in such a manner that the volumne of nascent or active oxygen which subsequently may be liberated from the product within a given time is greatly increased.

While I have not yet definitely ascertained whether the result of the process is to actually increase the amount of oxygen in the compound so as to produce a product having a formula different from the formula of the product of my prior United States Patent No. 1,585,602, it is my present belief that the formula of the new product resulting therefrom should be stated as $C_{10}H_{18}O_x$, where $x$ designates oxygen atoms presumably in excess of 4. As previously stated, one gram of the product made according to the process of my United States Patent No. 1,585,602 and having the approximate formula therein designated as $C_{10}H_{18}O_4$, will liberate approximately 3 cc. of active or nascent oxygen in one hour of time. The same quantity of the product manufactured according to the present process and having the said approximate formula $C_{10}H_{18}O_x$ will liberate under the same conditions approximately 9 cc. of active or nascent oxygen in the same period of time. It is possible, however, that such increased amounts of the liberated oxygen is due to the more rapid rate of decomposition of the irradiated product, presumably due to the greater ionization of the oxygen therein, rather than to a definite increase in the oxygen content of the product. I do not, therefore, desire to be understood to be limited herein by either theory as explaining the reasons for the new results achieved by the process herein disclosed.

An important use of the product of the process herein disclosed is as a germicidal and therapeutic agent in which the amount of liberated nascent or active oxygen is the active germicide and the therapeutic agent is the residual product which is chiefly a terpene hydrocarbon. It will be seen, therefore, that this increase in the amount and rate of liberation of the active or nascent oxygen is a very important factor contributing materially to the successful use of the product as a therapeutic or germicidal agent.

The product formed by the present process is what I have previously termed an unstable oxygen compound of a terpene hydrocarbon, by which term is meant an oxygen compound of a terpene hydrocarbon which undergoes decomposition in the presence of moisture to liberate active oxygen and leave a residue of the terpene or of some lower oxygen compound thereof. Where the terpene hydrocarbon is, for example, oil of eucalyptus or cineol, it is known that such oils have a healing action when brought in contact with an open wound or skin abrasion so that an unstable oxygen compound of a terpene if capable of liberating sufficient active oxygen to thoroughly clean the wound or abrasion of infectious bacteria, will leave a sufficient residue of the terpene or lower oxygen compounds thereof to promote the growth of new healthy tissue and the consequent rapid healing of the wound or abrasion.

Since all of the scientific aspects of the present invention are not now fully known to me and in view of the known tendency of scientific research to continually explain and modify the theories underlying reactions of this type, it is impossible to state definitely at this time the exact formula of the product or to explain definitely the scientific phenomenon underlying the present process. It is apparent, however, that the irradiation of the product in its vapor phase by subjecting such vapors to the action of energy rays chiefly within the ultra violet spectrum and in the highly ionized atmosphere resulting from such irradiation, effects changes in the constituents in a manner not yet fully known so that either the rate of the subsequent decomposition of the product is accelerated or the amount of oxygen therein is remarkably increased, or both. At the present time it is my belief that the changes effected by the irradiation of the product in its vapor phase results in the coupling of additional atoms of active oxygen to the compound of the terpene and the oxygen. In other words, it is my belief that the product after the irradiation is more completely coupled with active oxygen than is the product prior to such treatment and consequently that its rate of decomposition in the presence of moisture is greatly accelerated. The resulting product is, in my opinion, a product containing increased volumes of oxygen over the products disclosed in my prior patents or over the products manufactured according to the processes of my prior patents. It is for this reason that I have assigned to the product the approximate formula $C_{10}H_{18}O_x$ where $x$ designates oxygen atoms in excess of 4. The product made according to the present process, upon contact with moisture, will continue to decompose with the liberation of nascent or active oxygen for a period of from 36 to 48 hours, although the rate of liberation appears to be appreciably slower after the first hour.

The accompanying drawing illustrates diagrammatically as an example a convenient arrangement of the apparatus for carrying out the present invention, it being understood that the single figure is a diagrammatic or schematic arrangement and that the process is not to be particularly limited thereto.

In the single figure of the drawing, the numeral 1 indicates an ozone generator of any approved type provided at its outlet end with a manifold 2 and a valved conduit 3. The ozone generator 1 converts a flow of air therethrough to provide an atmosphere containing ozone in varying amounts, one preferred type producing ozone in an amount somewhat in excess of approximately 2% by volume of the air passed therethrough. Using such a generator it will be seen, therefore, that the gas passing through the conduit 3 consists chiefly of air having 2% of ozone therein.

A valve 4 is provided in the conduit 3 and regulates the flow of gas through said conduit and into the reaction chamber 5. The reaction chamber 5 is heated in any suitable manner, such as, for example, an oil bath or other type of heating apparatus 6 to a temperature in excess of approximately 87° C. In one embodiment of the invention electrical resistance heaters of the immersion type have been successfully utilized.

The terpene hydrocarbon, such for example as oil of eucalyptus, cineol, or other oil containing cineol, is placed in the reaction chamber 5 and is designated by the numeral 7. As shown, the volume of the terpene hydrocarbon is maintained in the reaction chamber 5 at a suitable height to cover the discharge end of the conduit 3 and the inlet or feed tube 5a. When the reaction chamber is heated to approximately 87° C. or higher and the ozonized air is introduced therein and bubbled through the heated terpene hydrocarbon, white fumes will be formed which are carried out of the reaction chamber 5 and through the discharge conduit 8 to the settling chamber which preferably is in the form of a Woulffe bottle 9. If desired, an additional amount of the ozonized air may be introduced into the vaporous product passing into the Woulffe bottle 9 from the reaction chamber 5 by the provision of the auxiliary conduit 10 connected with the manifold 2 and provided with control valve 11. The conduit 10 and the valve 11 are shown in dotted lines in said figure.

From the Woulffe bottle 9 the vapors of the oxygen compound of terpene, either with or without the further addition of ozonized air, pass through the discharge conduit 12 to the reaction chamber 13, which in the present embodiment of the invention is preferably formed of borosilicate glass surrounding an ultra violet generator 14 of any desired type and secured in spaced airtight relation thereto. As indicated in the drawing, the ultra violet generator 14 is the type commonly known as a fused quartz mercury vapor arc. In carrying out the process of the present invention, I have successfully used a 6 inch arc lamp known commercially as the "Uviarc" ultra violet generator manufactured and supplied by the General Electric Mercury Vapor Lamp Company. The arc is enclosed in a fused quartz tube and is electrically connected with a suitable source of electrical energy. Upon establishing the arc and operating such a generator at approximately 410 watts, it generates energy rays within the ultra violet spectrum approximately as follows for each square centimeter and at a distance of 1 meter:

Near ultra violet (approximately 4000 to 3100 Angstrom units), approximately 237 microwatts;

Middle ultra violet (approximately 3100 to 2800 Angstrom units), approximately 95 microwatts;

Far ultra violet (approximately 1850 to 2800 Angstrom units), approximately 193 microwatts.

It is to be understood that the output of such energy rays will vary with the size and power of the generator employed. Such rays acting upon the vapors of the terpene-oxygen compound passing into the irradiation chamber 13, apparently cause an ionization of the entrapped air carried by such vapors and generate additional atoms of active or nascent oxygen which are coupled with the terpene or the oxygen-terpene compounds while in the vapor phase.

While for purposes of illustration I have shown the treatment of the product in but a single irradiation chamber, it is to be understood that any desired number of sizes of such chambers may be provided and that the vapors may be successively passed through various chambers in which they are subjected to further irradiation by any desired number or sizes of ultra violet generators. It is also to be understood that the irradiation chambers are not necessarily constructed of boro-silicate glass as any suitable type of materials may be used therefor.

The irradiated vapors either passing through one or a plurality of irradiation chambers 13 are discharged through a discharge conduit 15 through a scrubber or scrubbers 16 containing glass wool or equivalent filtering material and thence through a conduit 17 to the final condenser or collector 18.

While the ozonized air used as the initial oxidizing agent contains a high proportion of inert gases, the subsequent irradiation of the vapors has been found to reduce the proportion of such gases to the active oxygen content so that the final product which comes to the collecting system as above described is readily recovered through less elaborate collecting systems than were required in carrying out commercially the processes disclosed in my prior patents previously referred to.

The product prepared as above described is a pale amber colored mobile liquid having a low freezing point as it remains liquid at temperatures below approximately —17° C. It can be distilled under controlled conditions without any substantial decomposition or the resultant liberation of any appreciable quantities of the active or nascent oxygen. The product will decompose readily at normal atmospheric temperatures in the presence of moisture with the liberation of substantial volumes of active or nascent oxygen.

I have found that the exact formula of the product will vary with the amount of its oxidation and that a product which is passed through but one stage of irradiation will have a somewhat lesser volume of nascent or active oxygen released upon decomposition during the same time interval than the same amount of a similar product which is passed through more than one such irradiation treatment. However, the product passing through but a single irradiation treatment will, as previously disclosed, liberate approximately three times the volume of nascent or active oxygen to that which is liberated in the same length of time and from the same amount of the product as disclosed in my United States Patent No. 1,585,602 and as manufactured by the process therein disclosed. The product used in making these comparative tests was irradiated by passage in its vapor phase through a single irradiation chamber where it was exposed to the rays generated by the mercury arc ultra violet generator previously described. The complete spectral analysis of emitted rays per square centimeter and at a distance of 1 meter when the generator is operated at approximately 410 watts is approximately as follows:

|  | Microwatts |
|---|---|
| Far infra-red | 47 |
| Near infra-red | 95 |
| Visible | 299 |
| Near ultra violet | 237 |
| Middle ultra violet | 95 |
| Far ultra violet | 193 |

I claim:

1. The herein-disclosed process of making an oxygen-terpene compound having the empirical formula $C_{10}H_{18}O_x$, where "$x$" designates oxygen in excess of four atoms, comprising the novel step of ozonizing said vapors by irradiating unstable oxygen-terpene compounds in the vapor phase with energy rays chiefly within the ultra violet spectrum, and thereafter condensing the irradiated vapors to form a liquid product which is capable of liberating nascent oxygen upon partial decomposition thereof in the presence of moisture.

2. The herein-disclosed process of making an oxygen-terpene compound having the empirical formula $C_{10}H_{18}O_x$, where "$x$" designates oxygen in excess of four atoms, comprising the novel step of ozonizing said vapors by irradiating unstable oxygen-terpene compounds in the vapor phase with energy rays chiefly within the ultra violet spectrum in a closed chamber and at distances of not more than approximately one meter from the generating source of the said energy rays, and thereafter condensing the irradiated vapors to form a liquid product which is capable of liberating nascent oxygen upon partial decomposition thereof in the presence of moisture.

3. The process of making an oxygen-terpene compound having the empirical formula $$C_{10}H_{18}O_x$$

where "$x$" designates oxygen in excess of four atoms, the compound being capable of liberating active oxygen by decomposition in the presence of moisture, the process comprising heating an oxygen-terpene compound in the presence of ozone and air to a temperature in excess of approximately 87° C., and thereafter passing the resultant vapors through an ionized atmosphere while simultaneously subjecting the vapors to irradiation with energy rays chiefly within the range of the ultra violet spectrum, and thereafter scrubbing the vapors and condensing the irradiated and scrubbed vapors to form a liquid product.

4. The herein-disclosed process of making an oxygen compound of a terpene selected from the group consisting of oil of eucalyptus, cineol and an oil containing cineol, comprising the novel step of irradiating unstable oxygen-terpene compounds in the vapor phase with energy rays chiefly within the ultra violet spectrum, and thereafter condensing the irradiated vapors to form a liquid product which is capable of liberating nascent oxygen upon partial decomposition thereof in the presence of moisture.

5. The herein-described compound corresponding to the formula $C_{10}H_{18}O_x$ where "$x$" indicates oxygen atoms in excess of four, the said product in the presence of moisture undergoing decomposition at normal atmospheric temperatures and pressures at such a rate that one gram of said product will liberate at least 9 cc. of active oxygen within a time interval of approximately one hour.

6. The herein-described oxygen compound of oil of eucalyptus corresponding to the formula $C_{10}H_{18}O_x$ where "$x$" indicates oxygen atoms in excess of four, the said product in the presence of moisture undergoing decomposition at normal atmospheric temperatures and pressures at such a rate that one gram of said product will liberate at least 9 cc. of active oxygen within a time interval of approximately one hour.

7. The product as claimed in claim 6 and further characterized in that the compound is decomposed and active oxygen is liberated upon placing the compound in contact with a wound or skin abrasion and which after decomposition and liberation of said oxygen leaves as a residue a therapeutic film consisting of the substantially unoxidized oil of eucalyptus hydrocarbon.

ALEXANDER S. RAMAGE.